United States Patent
Lai et al.

(10) Patent No.: US 6,944,730 B2
(45) Date of Patent: Sep. 13, 2005

(54) READ/WRITE SCHEDULING APPARATUS OF CONTROLLER CHIP AND METHOD FOR THE SAME

(75) Inventors: Jiin Lai, Taipei (TW); Sheng-Chung Wu, Hsin Tien (TW)

(73) Assignee: Via Technologies, Inc., Taipei Hsien (TW)

( * ) Notice: Subject to any disclaimer, the term of this patent is extended or adjusted under 35 U.S.C. 154(b) by 269 days.

(21) Appl. No.: 10/352,090
(22) Filed: Jan. 28, 2003

(65) Prior Publication Data

US 2003/0167385 A1 Sep. 4, 2003

(30) Foreign Application Priority Data

Mar. 1, 2002 (TW) ........................................ 91103867 A

(51) Int. Cl.$^7$ ............................................. G06F 12/00
(52) U.S. Cl. ........................ 711/158; 711/154; 711/167
(58) Field of Search ................................ 711/154, 158, 711/167

(56) References Cited

U.S. PATENT DOCUMENTS

| | | | | |
|---|---|---|---|---|
| 5,842,038 A | * | 11/1998 | Williams et al. ............... | 710/5 |
| 6,088,772 A | * | 7/2000 | Harriman et al. ............ | 711/158 |
| 6,092,158 A | * | 7/2000 | Harriman et al. ............ | 711/151 |
| 6,295,586 B1 | * | 9/2001 | Novak et al. ................ | 711/154 |
| 6,496,906 B1 | * | 12/2002 | Novak et al. ................ | 711/154 |
| 6,564,304 B1 | * | 5/2003 | Van Hook et al. .......... | 711/154 |
| 6,601,151 B1 | * | 7/2003 | Harris ........................ | 711/158 |
| 2003/0070055 A1 | * | 4/2003 | Johnson et al. ............. | 711/202 |
| 2003/0079073 A1 | * | 4/2003 | Richard et al. ............. | 710/302 |

* cited by examiner

Primary Examiner—Stephen C. Elmore
(74) Attorney, Agent, or Firm—Rosenberg, Klein & Lee

(57) ABSTRACT

A read/write scheduling apparatus of controller chip and method for the same. The read/write scheduling apparatus is used for arbitrating a plurality of read and write requests from a CPU to access a memory unit. The read request has higher priority in a host bandwidth limited case and the write requests in write queues are not sent until a predetermined amount of write requests are accumulated. In a DRAM bandwidth limited case, the read and the write requests have the same priority. The scheduling apparatus counts the number of the read and write requests to the memory unit within a predetermined time, the operation is changed to DRAM bandwidth limited case in case that the counted number is larger than a predetermined number.

14 Claims, 2 Drawing Sheets

READ/WRITE SCHEDULING APPARATUS OF CONTROLLER CHIP AND METHOD FOR THE SAME

FIELD OF THE INVENTION

The present invention relates to a read/write scheduling apparatus of controller chip and method for the same, especially to a read/write scheduling apparatus of controller chip for managing both the host bandwidth limited case and the DRAM bandwidth limited case of data accessing in computer system and method for the same.

BACKGROUND OF THE INVENTION

The CPU is the heart of a computer for executing command and other versatile function. To simplify layout, a controller chip is provided as interface between the CPU and memory (such as DRAM), accelerated graphic port (AGP) and other peripherals. The controller chip generally comprises FIFO (first-in first-out) queues to temporarily store the requests from the CPU and the controller chip manages the FIFO queues for efficiency operation of the computer system.

FIG. 1 shows a block diagram illustrating the arrangement of a prior art controller chip. The controller chip 6 is connected between a CPU 1 and a DRAM unit 2. The controller chip 6 is composed of a write queue 5, a read queue 4 and an arbiter 3. The write requests of the CPU 1 for accessing the DRAM unit 2 are firstly stored in the write queue 5 and the read requests of the CPU 1 for accessing the DRAM unit 2 are firstly stored in the read queue 4. The arbiter 3 is coupled between the write queue 5 (the read queue 4) and the DRAM unit 2 and controls the transmission of the requests stored in the write queue 5 (the read queue 4) to the DRAM unit 2 for regulating the transaction between the CPU 1 and the DRAM unit 2.

In conventional computer, the CPU 1 has a host bus with bandwidth less than the bandwidth of the memory bus. In case that the CPU 1 sends a plurality of requests to the DRAM unit 2, a host bandwidth limited case is encountered wherein the host bus bandwidth is congested and the memory bus bandwidth is sufficient. To exploit fully ability of the CPU 1, the scheduler in the arbiter 3 processes read requests with higher priority in host bandwidth limited case. The read requests are dominant such that the CPU 1 will rapidly fetch required data for efficient processing.

On the other hand, the write requests are firstly stored in the write queue 5 and the arbiter 3 will halt the write requests until the accumulated number of the write requests exceeds a predetermined value. Therefore, the overall efficiency of the computer system can be enhanced.

In present computer system, the host bus has bandwidth larger than the bandwidth of the memory bus. Therefore, the computer system is operated in a DRAM bandwidth limited case, especially when the CPU 1 has sent many requests to the DRAM unit 2 and the bus bandwidth of the DRAM unit 2 is occupied by the requests of the CPU 1. The scheduler in the arbiter 3 should have more sophisticated strategy to prevent efficiency degrade of the computer system.

SUMMARY OF THE INVENTION

In one aspect of the present invention, the present invention provides a read/write scheduling apparatus connected between a CPU and a memory unit and comprising a read queue connected to the CPU and temporarily storing a plurality of read requests issued from the CPU for accessing the memory unit; a write queue connected to the CPU and temporarily storing a plurality of write requests issued from the CPU for accessing the memory unit; a decision unit used discriminate between a host bandwidth limited case and a memory bandwidth limited case according to the read and write requests from the CPU; and an arbiter connected to the read queue and the write queue. In the memory bandwidth limited case, the arbiter continuously sends the read and write requests stored in the read queue and the write queue to the memory unit.

In another aspect of the present invention, the present invention provides a read/write scheduling method for arbitrating a plurality of read requests and a plurality of write requests issued from a CPU for accessing a memory unit. The method comprises following steps: discriminating between a host bandwidth limited case and a memory bandwidth limited case according to the read and write requests from the CPU; continuously sending the read and write requests stored in the read queue and the write queue to the memory unit in the memory bandwidth limited case, wherein the read requests have higher priority.

In still another aspect of the present invention, the present invention provides a read/write scheduling method for arbitrating a plurality of read requests and a plurality of write requests issued from a CPU for accessing a memory unit. The method comprises following steps: counting the number of the read and write requests to the memory unit within a first predetermined time, changing operation mode to a memory bandwidth limited case in case that the counted number is larger than a first predetermined number; and continuously sending the read and write requests stored in the read queue and the write queue to the memory unit in the memory bandwidth limited case, wherein the read requests have higher priority.

The various objects and advantages of the present invention will be more readily understood from the following detailed description when read in conjunction with the appended drawing, in which:

DETAILED DESCRIPTION OF THE INVENTION

The present invention is exemplified with a computer system with Pentium 4 CPU. The motherboard speed for the Pentium 4, CPU is 100 MHz, and the Pentium 4 CPU has 64 data lines and operates at 4× speed. Therefore, the host bus bandwidth is:

$$100 \text{ MHz} \times 4 \times 8 \text{ (byte)} = 3.2 \text{ Gbyte/s}.$$

Moreover, the current bandwidth of double data rate (DDR) DRAM with 133 Hz frequency and 64 data lines is $$133 \text{ MHz} \times 2 \times 8 \text{ (byte)} = 2.1 \text{ Gbyte/s}.$$

In above-mentioned computer architecture, the host bus bandwidth is larger than the memory bus bandwidth. Therefore, the DRAM bandwidth limited case is encountered especially when the CPU 1 sends a plurality of read/write requests to the DRAM unit 2.

The important issue in the DRAM bandwidth limited case is to exploit the full capability of DRAM unit 2. The conventional arbiter halts the write queue until the accumulated number of the write requests exceeds a predetermined value, which is inefficient and degrades the performance of the computer system in DRAM bandwidth limited case.

Figure 1:
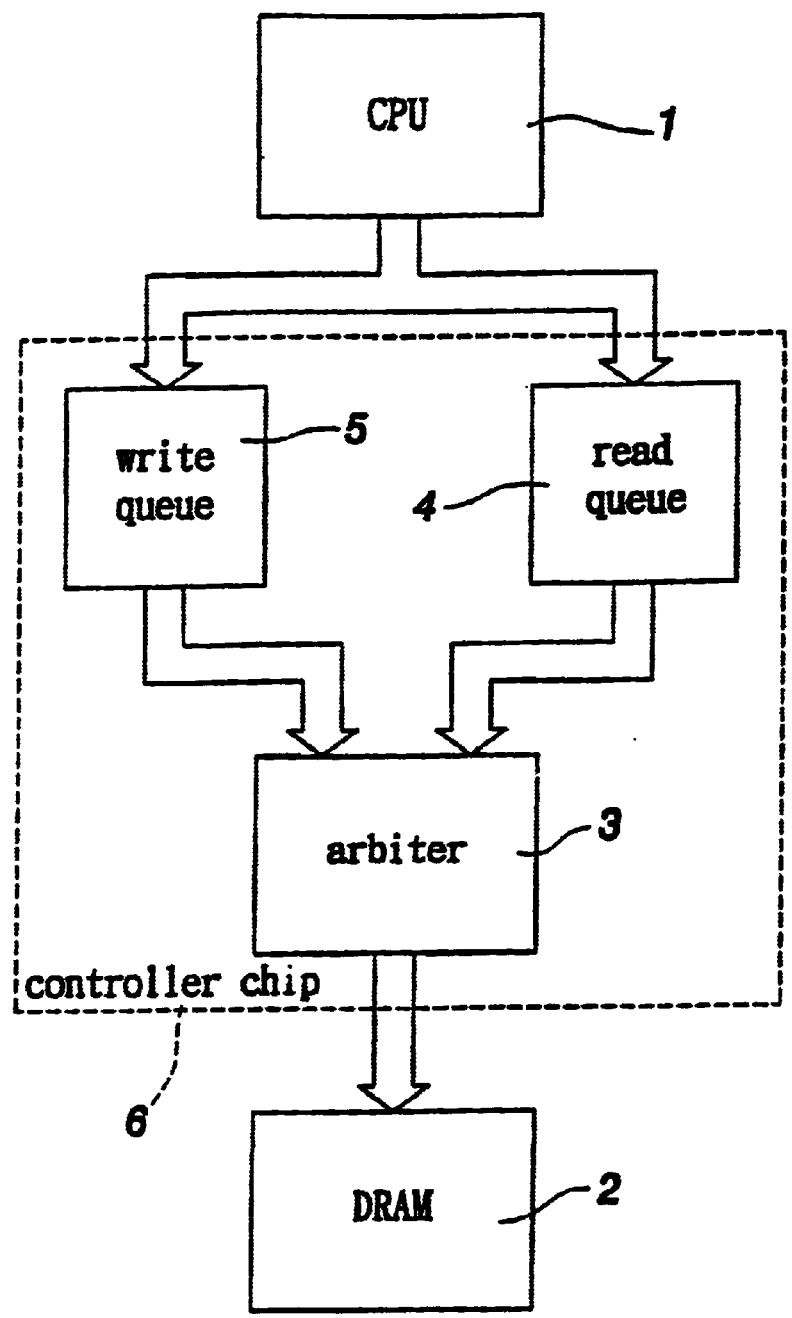
FIG. 1 shows a block diagram illustrating the arrangement of a prior art controller chip.
Figure 2:
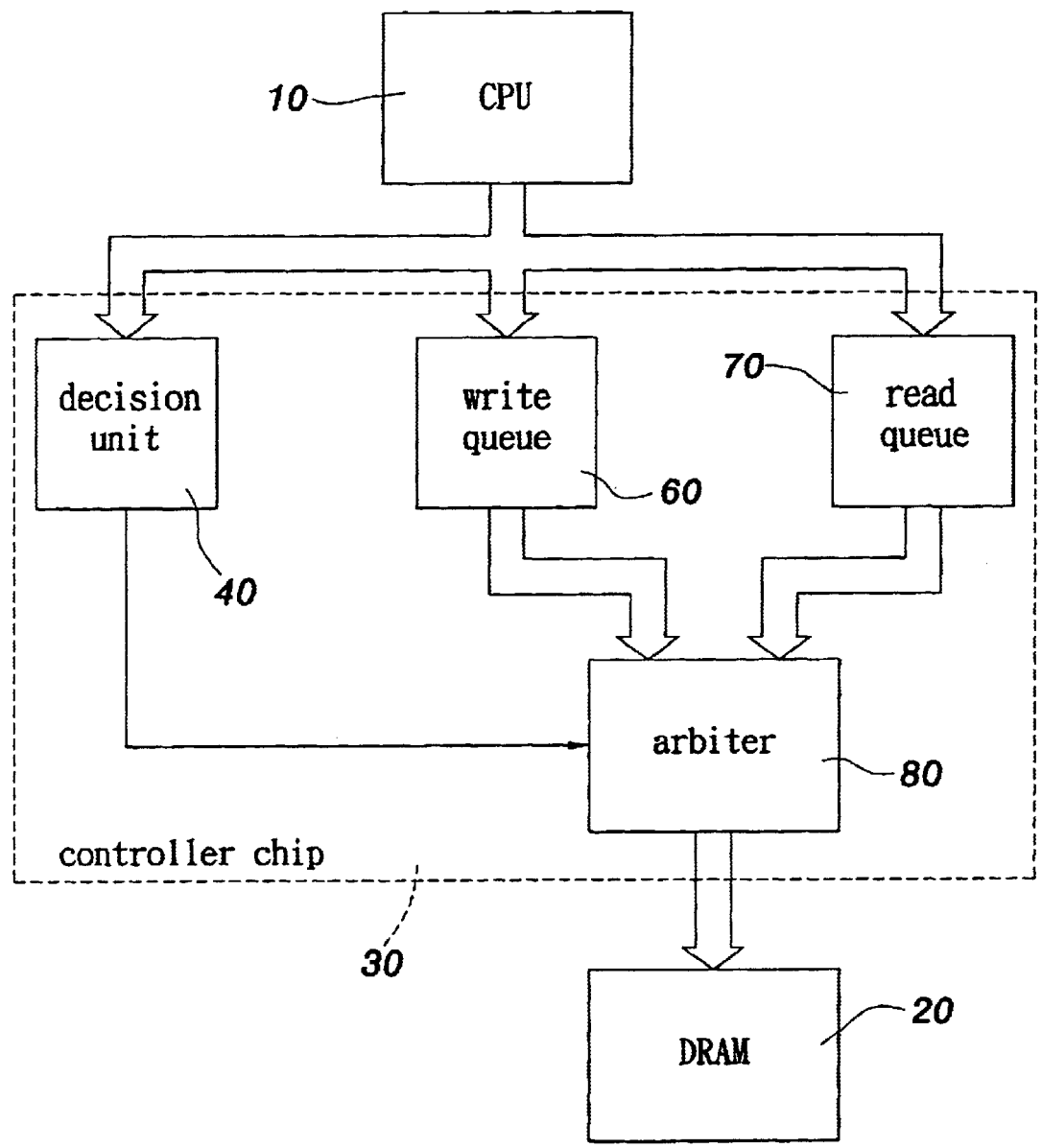
FIG. 2 shows a block diagram of the controller chip of the present invention.

FIG. 2 shows a block diagram of the controller chip 30 connected between a CPU 10 and a memory unit 20. The memory unit 20, for example, can be DRAM unit, DDR DRAM, multiple data rate RAM and Rambus memory. The controller chip 30 is used to schedule the read/write request of the CPU 10 to a DRAM unit 20 and comprises at least a decision unit 40, a write queue 60, a read queue 70 and an arbiter 80.

The decision unit 40 is used to judge whether the request from the CPU 10 to the DRAM unit 20 are issued in the host bandwidth limited case or the DRAM bandwidth-limited case. The computer system is in the host bandwidth limited case in case that the CPU 10 sends read/write request to the DRAM unit 20 in intermittent way. The arbiter 80 of the controller chip 30 works in similar way as conventional approach, wherein the write requests are firstly stored in the write queue 60 and will not be sent by the arbiter 80 until the accumulated number of the write requests exceeds a predetermined value.

On the other hand, the computer system is in the DRAM bandwidth limited case in case that the CPU 10 sends read/write request to the DRAM unit 20 in continuous way. In this case, the arbiter 80 of the controller chip 30 will continuously send read requests in the read queue 70 and the write requests in the write queue 60 to the DRAM unit 20 in order to fully exploit the capability of the DRAM unit 20. In other word, once the read/write request is present in the queue, the arbiter 80 of the controller chip 30 will send the request to the DRAM unit 20.

More particularly, in the DRAM bandwidth limited case, the DRAM unit 20 will operate in response to both read request and write request, while the CPU 10 will operate only to the read request. Accordingly, for the arbiter 80, the read request has higher priority than the write request when both read request and write request are present.

In the present invention, the decision unit 40 is realized by a timer. In host bandwidth limited case, a setting timer is activated to counts the number of the read/write requests to the DRAM unit 20 issued from the CPU 10 within a predetermined time. In case that the counted number is larger than a predetermined number, the setting timer will inform the arbiter 80 to change the operation mode into DRAM bandwidth limited case, and the arbiter 80 will deal the access request on DRAM bandwidth limited base as stated above. Moreover, in DRAM bandwidth limited case, a resetting timer is activated to counts the number of the read/write requests to the DRAM unit 20 issued from the CPU 10 within a predetermined time. In case that the counted number is smaller than a predetermined number, the resetting timer will inform the arbiter 80 to change the operation mode into host bandwidth limited case, and the arbiter 80 will deal the access request on host bandwidth limited base as stated above.

As can be seen from above description, the read/write scheduling apparatus of controller chip according to the present invention can enhance the data accessing performance of computer system; especially in DRAM bandwidth limited case.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A read/write scheduling apparatus connected between a CPU and a memory unit, comprising:
    a read queue connected to the CPU and temporarily storing a plurality of read requests issued from the CPU for accessing the memory unit;
    a write queue connected to the CPU and temporarily storing a plurality of write requests issued from the CPU for accessing the memory unit;
    a decision unit used discriminate an operation mode between a host bandwidth limited case and a memory bandwidth limited case according to the read and write requests from the CPU; and
    an arbiter connected to the read queue and the write queue;
    wherein in the memory bandwidth limited case, the arbiter continuously sending read and write requests stored in the read queue and the write queue to the memory unit.

2. The read/write scheduling apparatus as in claim 1, wherein the decision unit further comprises a setting timer used in the host bandwidth limited case, the setting timer counting the number of the read and write requests to the memory unit within a predetermined time, in case that the counted number is larger than a predetermined number, the timer will inform the arbiter to change the operation mode into the memory bandwidth limited case.

3. The read/write scheduling apparatus as in claim 1, wherein the decision unit further comprises a resetting timer used in the memory bandwidth limited case, the resetting timer counting the number of the read and write requests to the memory unit within a predetermined time, in case that the counted number is small than a predetermined number, the timer will inform the arbiter to change the operation mode into the host bandwidth limited case.

4. The read/write scheduling apparatus as in claim 1, wherein the arbiter sends the read requests to the memory unit with higher priority than the write requests in memory bandwidth limited case.

5. The read/write scheduling apparatus as in claim 1, wherein the memory unit is a DRAM memory unit.

6. The read/write scheduling apparatus as in claim 1, wherein the memory unit is a DDR DRAM memory unit.

7. The read/write scheduling apparatus as in claim 1, wherein the memory unit is a multiple data rate DRAM memory unit.

8. The read/write scheduling apparatus as in claim 1, wherein the memory unit is a Rambus memory unit.

9. A read/write scheduling method for arbitrating a plurality of read requests and a plurality of write requests issued from a CPU for accessing a memory unit, the method comprising following steps:
    discriminating an operation mode between a host bandwidth limited case and a memory bandwidth limited case according to the read and write requests from the CPU;
    in the memory bandwidth limited case, continuously sending the read and write requests stored in the read queue and the write queue to the memory unit, wherein the read requests have higher priority than the write request.

10. The read/write scheduling method as in claim 9, further comprising following steps:
  counting the number of the read and write requests to the memory unit within a predetermined time in the host bandwidth limited case; and
  changing the operation mode into the memory bandwidth limited case in case that the counted number is larger than a predetermined number.

11. The read/write scheduling method as in claim 9, further comprising following steps:
  counting the number of the read and write requests to the memory unit within a predetermined time in the memory bandwidth limited case; and
  changing the operation mode into the host bandwidth limited case in case that the counted number is not larger than a predetermined number.

12. A read/write scheduling method for arbitrating a plurality of read requests and a plurality of write requests issued from a CPU and used to access a memory unit, the method comprising following steps:
  counting the number of the read and write requests to the memory unit within a first predetermined time;
  changing an operation mode to a memory bandwidth limited case in case that the counted number is larger than a first predetermined number; and
  continuously sending the read and write requests stored in the read queue and the write queue to the memory unit in the memory bandwidth limited case, wherein the read requests have higher priority than the write requests.

13. The read/write scheduling method as in claim 12, further comprising following step:
  counting the number of the read and write requests to the memory unit within a second predetermined time in the memory bandwidth limited case;
  changing operation mode into a host bandwidth limited case in case that the counted number is not larger than a second predetermined number.

14. The read/write scheduling method as in claim 12 further comprising following step:
  waiting a plurality of clocks after the read requests are sent; and
  sending the write requests to the memory unit after ensuring no read requests being present.

* * * * *